United States Patent
Ren

(10) Patent No.: US 12,462,147 B2
(45) Date of Patent: Nov. 4, 2025

(54) FIRING NEURAL NETWORK COMPUTING SYSTEM AND METHOD FOR BRAIN-LIKE INTELLIGENCE AND COGNITIVE COMPUTING

(71) Applicant: NEUROCEAN TECHNOLOGIES INC., Guangdong (CN)

(72) Inventor: Hualong Ren, Guangdong (CN)

(73) Assignee: NEUROCEAN TECHNOLOGIES INC., Guangdong (CN)

(*) Notice: Subject to any disclaimer, the term of this patent is extended or adjusted under 35 U.S.C. 154(b) by 942 days.

(21) Appl. No.: 17/623,753

(22) PCT Filed: Jul. 1, 2020

(86) PCT No.: PCT/CN2020/099714
§ 371 (c)(1),
(2) Date: Dec. 29, 2021

(87) PCT Pub. No.: WO2021/000890
PCT Pub. Date: Jan. 7, 2021

(65) Prior Publication Data
US 2022/0253675 A1    Aug. 11, 2022

(30) Foreign Application Priority Data
Jul. 2, 2019    (CN) .......................... 201910588964.5

(51) Int. Cl.
*G06N 3/04*    (2023.01)
*G06N 3/049*    (2023.01)
(Continued)

(52) U.S. Cl.
CPC ............... *G06N 3/049* (2013.01); *G06N 3/08* (2013.01); *G06N 3/105* (2013.01)

(58) Field of Classification Search
None
See application file for complete search history.

(56) References Cited

U.S. PATENT DOCUMENTS

| | | | | |
|---|---|---|---|---|
| 11,216,722 | B2 * | 1/2022 | Nurvitadhi | G06N 3/044 |
| 2012/0109864 | A1 | 5/2012 | Modha | |
| 2020/0065712 | A1 * | 2/2020 | Wang | G06N 20/00 |

FOREIGN PATENT DOCUMENTS

| | | |
|---|---|---|
| CN | 105095967 A | 11/2015 |
| CN | 105913119 A | 8/2016 |

(Continued)

OTHER PUBLICATIONS

Hazan, Hananel, et al. "Bindsnet: A machine learning-oriented spiking neural networks library in python." Frontiers in neuroinformatics 12 (2018): 89. (Year: 2018).*

(Continued)

*Primary Examiner* — Hal Schnee
(74) *Attorney, Agent, or Firm* — Brooks Kushman P.C.

(57) ABSTRACT

A firing neural network computing system and method for brain-like intelligence and cognitive computing. The system includes a model description module, a parameter database, a configuration description module, a configuration manager, a rule manager, a data manager, a network builder, a network manager, an operation manager, a scheduler, a log manager, an operation monitoring module and a graphical display module. The system provides the function of automatically executing synapse and neuron pruning and genesis according to certain conditions and rules, and provides a variety of flexible trigger conditions for starting up pruning and genesis processes as well as rules for executing the processes, which eliminates the burden of neural network developers needing to write synapse and neuron pruning and genesis programs by themselves, thereby effectively solving several problems in existing brain-like firing neural network computing frameworks.

38 Claims, 4 Drawing Sheets

(51) Int. Cl.
*G06N 3/08* (2023.01)
*G06N 3/10* (2006.01)

(56) References Cited

FOREIGN PATENT DOCUMENTS

| | | |
|---|---|---|
| CN | 108182473 A | 6/2018 |
| CN | 108985447 A | 12/2018 |
| CN | 109816026 A | 5/2019 |
| CN | 109858620 A | 6/2019 |
| CN | 110322010 A | 10/2019 |
| EP | 3089080 A1 | 11/2016 |
| JP | 2015529357 A | 10/2015 |

OTHER PUBLICATIONS

Lin, Chit-Kwan, et al. "Programming spiking neural networks on Intel's Loihi." Computer 51.3 (2018): 52-61. (Year: 2018).*
Drewes, Richard P., Quan Zou, and Philip H. Goodman. "Brainlab: a Python toolkit to aid in the design, simulation, and analysis of spiking neural networks with the NeoCortical Simulator." Frontiers in neuroinformatics 3 (2009): 378. (Year: 2009).*
Rathi, Nitin, Priyadarshini Panda, and Kaushik Roy. "STDP-based pruning of connections and weight quantization in spiking neural networks for energy-efficient recognition." IEEE Transactions on Computer-Aided Design of Integrated Circuits and Systems 38.4 (2018): 668-677. (Year: 2018).*
Prieto, Alberto, et al. "Neural networks: An overview of early research, current frameworks and new challenges." Neurocomputing 214 (2016): 242-268. (Year: 2016).*
Kasabov, Nikola K. "NeuCube: A spiking neural network architecture for mapping, learning and understanding of spatio-temporal brain data." Neural networks 52 (2014): 62-76. (Year: 2014).*
Lin, Ji, et al. "Runtime neural pruning." Advances in neural information processing systems 30 (2017). (Year: 2017).*
Guo, Jia, and Miodrag Potkonjak. "Pruning filters and classes: Towards on-device customization of convolutional neural networks." Proceedings of the 1st International Workshop on Deep Learning for Mobile Systems and Applications. 2017. (Year: 2017).*
Dura-Bernal, Salvador, et al.; NetPyNE, a tool for data-driven multiscale modeling of brain circuits; eLife, 2019, pp. 1-26; https://doi.org/10.7554/eLife.444942019.
Pedretti G. et al;, Modeling-based design of brain-inspired spiking neural networks with RRAM learning synapses_IEEE Conference Publication 2017.
Liu J et al,; Dynamic priority arbitration strategy for interconnections of hardware Spiking Neural Networks, Tien Tzu Hsueh Pao/Acta Electronica Sinica, Published—Aug. 1, 2018, pp. 1890-1905.
Vitay Julien et al., ANNarchy: a code generation approach to neural simulations on parallel hardware. Frontiers in Neuroinformatics. vol. 9, Article 19. Jul. 31, 2015. 20 pages.
Rast, Alexander D., Scalable Event-Driven Modelling Architecture for Neuromimetic Hardware. ProQuest. 2011. 210 pages.
Office Action for Korean Patent Application No. 10-2022-7003194 dated Jan. 20, 2022. 11 pages.
Office Action for Japanese Patent Application No. 2022-500548 dated Dec. 12, 2022. 4 pages.
EP Office Action for EP Application No. 20 834 339.2, prepared by the European Patent Office, dated Sep. 8, 2025, 7 pages.

* cited by examiner

FIRING NEURAL NETWORK COMPUTING SYSTEM AND METHOD FOR BRAIN-LIKE INTELLIGENCE AND COGNITIVE COMPUTING

CROSS-REFERENCE TO RELATED APPLICATIONS

This application is the U.S. national phase of PCT Application No. PCT/CN2020/099714 filed on Jul. 1, 2020, which claims priority of the Chinese Patent Application No. 201910588964.5, filed at the Chinese Patent Office on Jul. 2, 2019 and entitled "FIRING NEURAL NETWORK COMPUTING SYSTEM AND METHOD FOR BRAIN-LIKE INTELLIGENCE AND COGNITIVE COMPUTING", the entire contents of which are incorporated herein by reference thereto.

BACKGROUND

Technical Field

The present application relates to the technical field of brain-like firing neural network simulation and high-performance computation, and particularly to a firing neural network computing system and a firing neural network computing method for brain-like intelligence and cognitive computing.

Description of Related Art

At present, brain-like intelligence and cognitive computation are based on firing neural networks, and perform computational modeling by combining various and plentiful working mechanisms in a biological brain such as neurotransmitters, neuromodulators, receptors, electrical synapses, chemical synapses, dendrites, neurons, and glias, and the constructed neural circuits, nerve nucleis, brain areas and the whole brain model can simulate many cognitive mechanisms and behaviors of the biological brain, such as memory and learning, simulated emotions, navigation and planning, motion control, brain-like vision and brain-like hearing, attention, decision-making, etc., thereby providing a broader development space for artificial intelligence systems.

However, the existing brain-like firing neural network computation frameworks have following problems.

First, the existing brain-like firing neural network computation frameworks are not provided with a unified and flexible modeling method, and can not support a flexible network topological structure, therefore they cannot balance between a modeling scale and modeling richness. For example, in terms of the modeling scale, most of the existing brain-like firing neural network computation frameworks cannot support and unify the modeling among a molecular scale, a neurotransmitter and neuromodulator scale, a receptor scale, a synaptic scale, a dendrite scale, a neuron scale, a glia scale, a neural circuit scale, a nerve nuclei scale, a nerve fiber bundle scale, a brain area scale, a whole brain scale, and a behavior scale. For example again, in terms of the modeling richness, the existing brain-like firing neural network computing frameworks often cannot support the modeling of the electrical synapses, cannot support the simulation of the working mechanism of the neuromodulators, cannot support the simulation of the mechanism that multiple synapses of the dendrites exchange information and perform logical operations, and cannot support the topological structure that a synapse is directly connected to another synapse either, and the like.

Second, the existing brain-like firing neural network computation frameworks provide no description method for simulating an organization manner of a biological brain and nerve system.

Third, the existing brain-like firing neural network computation frameworks do not integrate sufficient built-in functions and flexible user interfaces, for example, they cannot support automatic synapse and neuron pruning and genesis, therefore a user need to write programs by himself to realize related functions.

Fourth, the existing brain-like firing neural network computation frameworks cannot perform a mixed computation through effectively unity and combine a firing neural network, a traditional neural network, and other algorithm that uses tensors as a main data representation method.

Fifth, the existing brain-like firing neural network computation frameworks cannot be compatible with chip architectures such as CPU, ARM, GPU, DSP etc., and most of them cannot use a hardware resource in a more optimized manner, therefore the existing brain-like firing neural network computation frameworks are not suitable for running a medium or large-scale brain-like neural network on a general-purpose computer or an embedded device efficiently.

The existence of the above problems leads to a limited hardware platform modeling range, poor compatibility, low computing efficiency, and inconvenient development and use of the existing brain-like firing neural network computing frameworks, which is difficult for the brain-like intelligence and cognitive computing to be deployed in products such as a smart toy, a robot, a drone, an IOT device, a smart home, and an in-vehicle system etc. at low cost and a large scale.

Therefore, how to provide a flexible and efficient firing neural network computing system and a flexible and efficient firing neural network computing method for brain-like intelligence and cognitive computing is an urgent problem to be solved by those skilled in the art.

SUMMARY

One objective of embodiments of the present application is to provide a firing neural network computing system and a firing neural network computing method for brain-like intelligence and cognitive computing. The system provides a unified and flexible modeling method, and the provided network description method using a multi-level tree structure supports a full-scale modeling and a flexible network topology of the biological brain and nerve system, thereby organically unifying the modeling scale and the modeling richness, and fusing all models at various scales into a unified neural network for operations. Moreover, the system supports representing and storing data in a form of tensors, this not only enables the system to support the firing neural network, but also enables the system compatible with the traditional neural network (deep learning) and other algorithm that use the tensors as the main data representation method. The system further provides a function of automatic synapses and neurons pruning and genesis according to a certain condition and rule, which relieves burden that a neural network developer needs to implement related functions by himself, thereby effectively solving the above problems existed in the existing brain-like firing neural network computing frameworks.

In order to solve the above technical problems, technical solutions proposed by embodiments of the present application are as follows.

A firing neural network computing system for brain-like intelligence and cognitive computing is provided, and the system includes: a model description module, a parameter database, a configuration description module, a configuration manager, a rule manager, a data manager, a network builder, a network manager, a scheduler, a log manager, an operation monitoring module and a graphical display module;

the model description module is configured to provide an interface for a user to design and describe a network model;

the parameter database is configured to store all parameter data of a network including initializing parameters and parameters during execution; the parameter database may be selected as a binary file or a text file; the text file may adopt a file format of CSV or a file format using other character to separate data;

the configuration description module is configured to: describe configuration parameters of a current network operating environment, and a condition for initiating synapse and neuron pruning and genesis;

the configuration manager is configured to read the configuration description module to obtain configuration parameters of the system;

the network model object is constructed by the network builder and resides in a memory, and is used to characterize the entire network, including all containers, topological relationships and parameter data; and the network model object is an object scheduled to execute by the scheduler;

the rule manager is configured to: read rules declared by the user in the model description module, interpret the rules when the scheduler schedules an operation of the network model object, and arbitrate a conflict between the rules;

the data manager includes one or more kinds of decoder and encoder, and is configured to: read and parse the parameter database, convert a data format and serialize data; the user may add a customized decoder and encoder in the data manager to read and write a file in a customized format;

the network builder is configured to: read the model description module, parse a topological structure of a network, read a data file through the data manager, and construct the network model object in the memory;

the network manager is configured to: construct, traverse, access and update the network model object;

the operation manager is configured to manage all operations executable in the system; all the operations constitute an operation library; and the user may specify an operation required to be performed for each container in the model description module, and the corresponding operation is scheduled by the scheduler for execution during runtime;

the scheduler is configured to allocate hardware resources and schedule operation processes, so as to optimize operation efficiency;

the log manager is configured to: record a log generated when the system is running, prompt the user of a working status and an abnormal condition of the system;

the operation monitoring module is configured to: receive and respond to a user input, and manage an operating status of the system including a default state, a network construction state, a network operating state and a network pausing state;

the graphical display module is configured to read data of the network and display it to the user, so as to facilitate development, monitoring and debugging.

Optionally, the model description module includes a network description unit, a confluence description unit and a flow description unit that are configured to describe components and a topological structure of the entire network together; the network description unit, the confluence description unit and the flow description unit may select as a text file and use a nested syntax, and may select a file format of XML or JSON.

Optionally, the model description module adopts a network description manner of a multi-level tree structure simulating an organizing manner of a biological brain nerve system;

the confluence description unit supports organization of the nodes in the network according to a preset layer and module arrangement configured to characterize a multi-level organization manner of neurons and related glias in a biological brain (for example, nucleus→brain area→whole brain);

the flow description unit supports grouping the edges in the network according to topological (connection relationship) similarity and organizing the edges in the network in a hierarchical arrangement, characterizing multiple organization manners of nerve synapses in the biological brain (such as dendrite, projection in a neural pathway, and nerve fiber bundle etc.) and an organization manner of protuberances of the related glia.

Optionally, the network description unit is configured to: describe containers such as a network container and a parameter container, describe parameters and operating rules of the entire network, and point to one or more confluence description units and flow description units through links;

the confluence description unit is configured to: describe containers such as a confluence container, a module container, a layer container, a node container, a node parameter container, and a parameter container etc., and describe a division relationship of modules and layers of nodes in the network, parameters of each of the containers, and rules and commands during runtime of each of the containers;

the flow description unit is configured to: describe containers such as a flow container, a channel container, a link container, an edge container, an edge parameter container, and a parameter container etc., and describe a connection (topology) relationship of the edges in the network, parameters of each of the containers, and rules and commands during runtime of each of the containers.

Optionally, "Network" represent a network container located at a first level (the highest level) of the tree structure and configured to characterize a model at a whole brain and behavior scale, and each Network may accommodate one or more Confluences and Flows;

"Confluence" represents a confluence container located at a second level of the tree structure and configured to characterize a model at a brain area scale, and each Confluence may accommodate one or more Modules;

"Module" represents a module container located at a third level of the tree structure and configured to characterize a model at a nerve nucleus scale, and each Module may accommodate one or more Layers;

"Layer" represents a layer container located at a fourth level of the tree structure and configured to characterize a model at a neural circuit scale, and each Layer may accommodate one or more Nodes;

"Node" represents a node container located at a fifth level of the tree structure and configured to characterize a model at a neuron scale or a glia scale and further characterize a group of neurons or glias, and each Node may accommodate one or more NodeParams;

"Node" may also be used to characterize an input and/or output node, configured to interface with an I/O device of the system, such as a camera input, an audio input, a sensor input, a control output, etc., and may read and write data from the I/O device and dynamically update the data through each NodeParam of this Node;

"NodeParam" represents a node parameter container located at a sixth level (the lowest level) of the tree structure and configured to characterize a model at a molecular scale, a receptor scale, a neurotransmitter or neuromodulator scale, and configured to characterize a tensor of parameters of a group of neuron models or glia models;

"Flow" represents a flow container located at the second level of the tree structure and configured to characterize a model at a scale of a nerve fiber bundle connecting brain areas, and each Flow may accommodate one or more Channels;

"Channel" represents a channel container located at the third level of the tree structure and configured to characterize a model of a conduction bundle comprising axons connecting nerve nuclei, and each Channel may accommodate one or more Links;

"Link" represents a link container located at the fourth level of the tree structure and configured to characterize a model of a neural pathway comprising axons in a neural circuit, and each Link may accommodate one or more Edges;

"Edge" represents an edge container located at the fifth level of the tree structure and configured to characterize a model at a dendrite scale or synaptic scale, and configured to characterize protuberances of a group of synapses or glias, and each Edge may accommodate one or more EdgeParams;

"Edge Param" represents an edge parameter container located at the sixth level (the lowest level) of the tree structure and configured to characterize the model at the molecular scale, the neurotransmitter or neuromodulator scale, the receptor scale, and configured to characterize a parameter tensor of a model of the protuberances of the group of synapses or glias;

"Param" represents a general parameter container used as an auxiliary container. According to the needs of modeling, each of the above containers may be additionally provided with one or more Params so as to accommodate the parameter data in a form of a tensor; or, the container at each level may also be provided without Param;

each of the above containers includes a number and name used in the multi-level tree structure for index;

each of the above containers is provided with one or more control blocks configured to store statistic and control information, including a traversal sequence and rule of the network, a number of times that an traversal operation has been performed, whether data has been stored in a main memory, whether the data has been stored in a memory of a coprocessor, and a frequency of reading and writing a hard disk, and the like, and the control blocks are managed and updated by the rule manager and the scheduler.

Optionally, a firing characteristic of the neuron model may be constructed as tonic firing, rapid firing, burst firing, plateau firing or phasic firing etc.;
   a response of the neuron model to an upstream input signal may be constructed as different neural adaptation or sensitivity curves;
   a mechanism of the neuron model acting downstream may be constructed as an excitatory model, an inhibitory model, a modulatory model or a neutral model;
   the neuron model may be constructed as a firing neuron model and a traditional neuron model;
   the glia model may be constructed as an astrocyte model, an oligodendrocyte model, a microglia model, a Schwann cell model and a satellite cell model.

Optionally, the neurotransmitter or neuromodulator model may be constructed as an excitatory model, an inhibitory model, or a modulatory model;
   the receptor model may be constructed as an ionotropic model or a metabolic model;
   a response effect to the receptor model on a neurotransmitter or a neuromodulator may be constructed as an excitatory model, an inhibitory model, a modulatory model, or a neutral model.

Optionally, the model at the dendrite scale may be constructed as an apical dendrite model, a basal dendrite model, or a spine model;
   the synapse model may be constructed as an excitatory model, an inhibitory model, a modulatory model, or a neutral model.

Optionally, the model at the molecular scale may be constructed as an intracellular molecular model, a cytomembrane molecular model, and an intercellular molecular model.

Optionally, the "NodeParam", the "EdgeParam" and the "param" internally adopt a form of a tensor (i.e., a multi-dimensional matrix) to accommodate parameters,
   the tensor may be one-dimensional or multi-dimensional, and a specific arrangement and using manner of the tensor is specified by the user;
   the tensor may be configured as four-dimensional, and positions of the parameters in the tensor may be indicated by a coordinate (x, y, z, t), where three dimensions of x, y, and z correspond to a spatial arrangement position of each of neural tissue (such as neuron or synapse or the like) models characterized in a parent container; t indicates a time dimension, may be used to characterize cache and delay of timing information, and may be used to simulate a long-term action mechanism (provided with delay) of the neuromodulator on the neuron and synapse;
   the parameters in the tensor may be shared by all or part of the neural tissue (such as neuron or synapse or the like) models in the parent container, and may be used to simulate a large-area effect of the neuromodulator on all neural tissues in a target area.

Optionally, the flow container and all child containers thereof may correspond to one or more upstream containers and one or more downstream containers, and the upstream containers and the downstream containers are accessed through indexing numbers or names thereof,
   the upstream container and downstream container may both be containers at any level, and the upstream container and downstream container may be the same container or different containers;
   each of the flow container and all child containers thereof may constitute an information flow pathway with an upstream container and a downstream container thereof, the information flow pathway characterizes a (unidirectional or bidirectional) flow and processing process of information between two information sources (such as the upstream container and the downstream container), and a plurality of containers in the network constitute an arbitrary topological structure for information flow.

Optionally, the flow and processing process of the information may be used to realize a plurality of biological brain nerve mechanisms including: conduction of nerve firing between the neurons through the synapses, information exchange between the synapses, and plasticity of the neurons and the synapses, and so on.

Optionally, the arbitrary topological structure of the information flow may be used to realize a connection manner of any neural circuit in the brain nerve system, including: a feedback connection supporting that the same neuron is connected back to itself, a mutual connection between the neurons of the same group (layer), an arbitrary connection (in succession/feedforward, cross-layer, feedback etc.) between the neurons of different groups (layers), and a direct connection between the synapses, and allowing endless loop calculations for the feedback connection.

Optionally, the system supports a modeling design manner that decompose of a model at any level (or scale) into two parts of data and operation,
- the data may be accommodated in the "NodeParam", the "EdgeParam" or the "Param", and is stored in the corresponding parameter database;
- the operation is configured as an executable program (such as a function, and a class including a function) that can access and update the aforementioned data, and the operation can execute on a general-purpose CPU, ARM, DSP, GPU, or other processor to ensure that the system is provided with cross-hardware platform versatility to some extent.

Optionally, the system supports the user to define one or more operations to make the neurons in the same "Node" (without using "Edge") directly accesses each other and updates each other's data, so as to realize rapid exchange of information and simulate electrical synapses in a biological brain nerve system.

Optionally, the system supports the user to define one or more operations to make the synapses in the same "Edge" directly access each other and update each other's data, so as to achieve rapid exchange of information and simulate a situation of performing mutual information exchange and a logic operation among a plurality of synapses on dendrites of the same neuron in a biological brain nerve system, including a mechanism such as a shunting inhibition mechanism etc.

Optionally, the system supports automatic execution of a function of synapse and neuron/or pruning and/or genesis according to a preset trigger condition and execution rule;
- the trigger condition may be specified by the user in the configuration description module;
- the execution rule may be specified by the user in the model description module;
- the execution rule may act on the network model object, and may also act on a sub-network or a specific container;
- the synapse and neurons pruning and genesis process is scheduled and executed by the scheduler, and may be executed at a network operating state and/or at a network pausing state.

Optionally, the trigger condition includes one or more of:
- a user command, wherein the user inputs a command to the system through a keyboard or a mouse or other manner, and the system executes the pruning or genesis process immediately or after a first preset time once receiving the command;
- continuous execution, wherein the pruning or genesis process is executed when a model of the network or a sub-area thereof meets a rule of the pruning or genesis process;
- interval execution, wherein the system automatically starts the pruning or genesis process according to a first preset time interval or a first preset traversal period.

Optionally, the execution rule of the pruning process includes a synaptic pruning rule and a neuron pruning rule;
the synapse pruning rule includes one or more of following:
- if a parameter of a certain synapse and a statistic of parameters of all synapses in a designated reference synapse set reach a first preset numerical relationship (for example, a weight of a certain synapse is less than 1% of a mean weigh of all synapses in a designated edge), then this synapse is a synapse to be pruned;
- if a parameter of a certain synapse and a designated threshold reach a second preset numerical relationship (for example, a weight of a certain synapse is less than 10.0), then this synapse is a synapse to be pruned;
- if a certain synapse is not triggered after a second preset time or a second preset traversal period, then this synapse is a synapse to be pruned;
- if a certain synapse is marked as a synapse to be pruned by other operation process, then this synapse is a synapse to be pruned; pruning may be performed for the synapse to be pruned;

the neuron pruning rule includes one or more of following:
- if a certain neuron is not provided with an input synapse, then this neuron is a neuron to be pruned;
- if a certain neuron is not provided with an output synapse, then this neuron is a neuron to be pruned;
- if a certain neuron is not provided with an input synapse or an output synapse, then this neuron is a neuron to be pruned;
- if a parameter of a certain neuron and a statistic of parameters of all neurons in a specified reference neuron set reach a third preset numerical relationship (for example, a threshold of a certain neuron is greater than a maximum value of thresholds of all neurons in a designated node), then this neuron is a neuron to be pruned;
- if a parameter of a certain neuron and a designated threshold reach a fourth preset numerical relationship (for example, a threshold of a certain neuron is greater than 1000.0), then this neuron is a neuron to be pruned;
- if a certain neuron does not perform firing after a third preset time or a third preset traversal period, then this neuron is a neuron to be pruned; if a certain neuron is marked as a neuron to be pruned by other operation process, then this neuron is a neuron to be pruned; pruning may be performed for the neuron to be pruned.

Optionally, the execution rule of the genesis process is divided into a neuron genesis rule and a synapse genesis rule;
the neuron genesis rule includes one or more of following:
- if a number of existing neurons in a certain node container and a total capacity of this node container reach a first preset ratio or a fifth preset numerical relationship, new neurons are generated at a second preset ratio or first preset number of the total capacity of this node container; here the first preset ratio may be same or different with the second preset ratio;

new neurons are generated in a certain node container at a third preset ratio or a second preset number of the total capacity according to a first preset rate (that is, according to a preset time interval or a preset traversal period);

if a certain node container is marked as a node container needing to generate new neurons by other operation process, then the new neurons are regenerated at a second preset rate (that is, at a preset ratio or amount of its total capacity every preset time interval or preset traversal period);

the synapse genesis rule includes one or more of following:

if a number of existing synapses of a certain edge container and a total capacity of this edge container reach a fourth preset ratio or a sixth preset numerical relationship, then new synapses are generated at a fifth preset ratio or a third preset number of the total capacity of this edge container; here the fourth preset ratio may be the same or different with the fifth preset ratio;

new synapses are generated in a certain edge container at a third preset rate (that is, at a preset ratio or amount of its total capacity according to a preset time interval or preset traversal period);

if a certain edge container is marked as an edge container needing to generate new synapses, then the new synapses are generated at a fourth preset rate (that is, at a preset ratio or amount of its total capacity according to a preset time interval or preset traversal period);

if a certain node container is not provided with a neuron having an input synapse or an output synapse, then new input synapses or new output synapses are respectively generated in the corresponding edge containers.

Optionally, the user may specify one or more rules for each container in the model description model, and the one or more rules constitute a rule base;

the rule manager sorts rules in the rule base according to a preset priority, only a rule provided with the highest priority is executed when multiple rules acting on one container conflict with each other, and the rule manager adopts a default rule for execution when there is no rule specified for one container;

the rules in the rule base includes: a traversal rule, a memory usage rule, a data I/O rule, and a synapse and neuron pruning and genesis rule;

the traversal rule is used to guide the scheduler to repeatedly traverse or skip traversing all or specific containers of the network according to a second preset time interval or a fourth preset traversal period, so as to concentrate computing resources in a sub-network having intensive calculations and improve usage efficiency of the data;

the memory usage rule is used to guide the scheduler to arrange usage of a main memory and a memory of a coprocessor;

the data I/O rule is used to guide the scheduler to schedule a frequency of data exchange between the main memory and the memory of the coprocessor and between a memory and a hard disk, so as to save the I/O resources and improve overall operation efficiency.

Optionally, the scheduler manages one or more main memory pools and one or more device memory pools, so as to reasonably allocate usage of the network model object in the main memories and the device memories;

the main memory pools are configured to manage usage of the main memories;

the device memory pools corresponds to coprocessors (which may be an ARM, a GPU, a DSP, an ASIC etc.) and are configured to manage usage of corresponding device memories;

maximum capacity and minimum capacity of the main memory pools and the device memory pools are specified by the user through the configuration description module.

Optionally, the scheduler manages one or more thread pools configured to dynamically arranging child threads to participate in a multi-thread operation, so as to reasonably schedule an operation load of a main computing unit (which may be a CPU, an ARM, etc.), a coprocessor (which may be an ARM, a GPU, a DSP, etc.), and/or an I/O device (such as a hard disk, a camera, an audio input, a control output, etc.).

Optionally, the scheduler manages one or more node data input buffers, one or more node data output buffers, one or more edge data input buffers and one or more edge data output buffers that are used to buffer data required for reading and writing a hard disk or the I/O device, so that the scheduler is capable of arranging the hard disk or the I/O device to read and write in time based on a load of a processor, the hard disk and/or the I/O device, so as to avoid I/O blocking, capacity of each of the buffers, a maximum frequency and a minimum frequency of reading and writing the hard disk or the I/O device, and a maximum throughput and a minimum throughput of reading and writing the hard disk or the I/O device are specified by the user through the configuration description module.

The present application further provides a firing neural network computing method for brain-like intelligence and cognitive computing, and the method uses the above mentioned firing neural network computing system for brain-like intelligence and cognitive computing.

It can be seen from the above technical solutions that, compared with the prior art, the present application discloses and provides a firing neural network computing method and system for brain-like intelligence and cognitive computing, the system has provided a flexible and unified modeling method, and the provided multi-level tree structure network description manner supports a full-scale modeling and a flexible network topology of the biological brain nerve system, thereby the modeling scale and the modeling richness are organically unified, and all models at various scales are integrated into a unified neural network for operation; in addition, the system supports characterizing and storing the data in the form of tensors, which makes this system not only support the firing neural network, but also be compatible with the traditional neural network (deep learning) and other algorithms that use tensors as the main data characterizing method; the present application also provides a function of automatic execution of the synapse and neuron pruning and genesis according to a certain condition and rule, thereby relieving the burden that a neural network developer needs to realize related functions by himself.

The above modeling design method may be to decompose the model at any level (or scale) into two parts: data and operation. As mentioned earlier, the data may be accommodated by "NodeParam", "EdgeParam" or "Param", and stored by the corresponding parameter database. The operation is an executable program (such as a functions and a class containing a function) that can access and update the aforementioned data.

BRIEF DESCRIPTION OF THE DRAWINGS

In order to more clearly describe the technical solutions in the embodiments of the present application, accompanying drawings that need to be used in the description for the embodiments or exemplary technologies will be briefly introduced below. Obviously, the accompanying drawings in the following description are only some embodiments of the present application, and other drawings may be obtained by those of ordinary skill in the art based on these drawings without paying any creative work.

DETAILED DESCRIPTION OF THE EMBODIMENTS

In order to make the purpose, technical solutions, and advantages of the present application more comprehensible, the present application will be described in detail below with reference to the accompanying drawings and embodiments. It should be understood that the specific embodiments described herein are only used to explain the present application, and are not used to limit the present application.

In order to illustrate the technical solutions of the present application, detailed descriptions are given below in conjunction with the specific drawings and embodiments.

Figure 1:
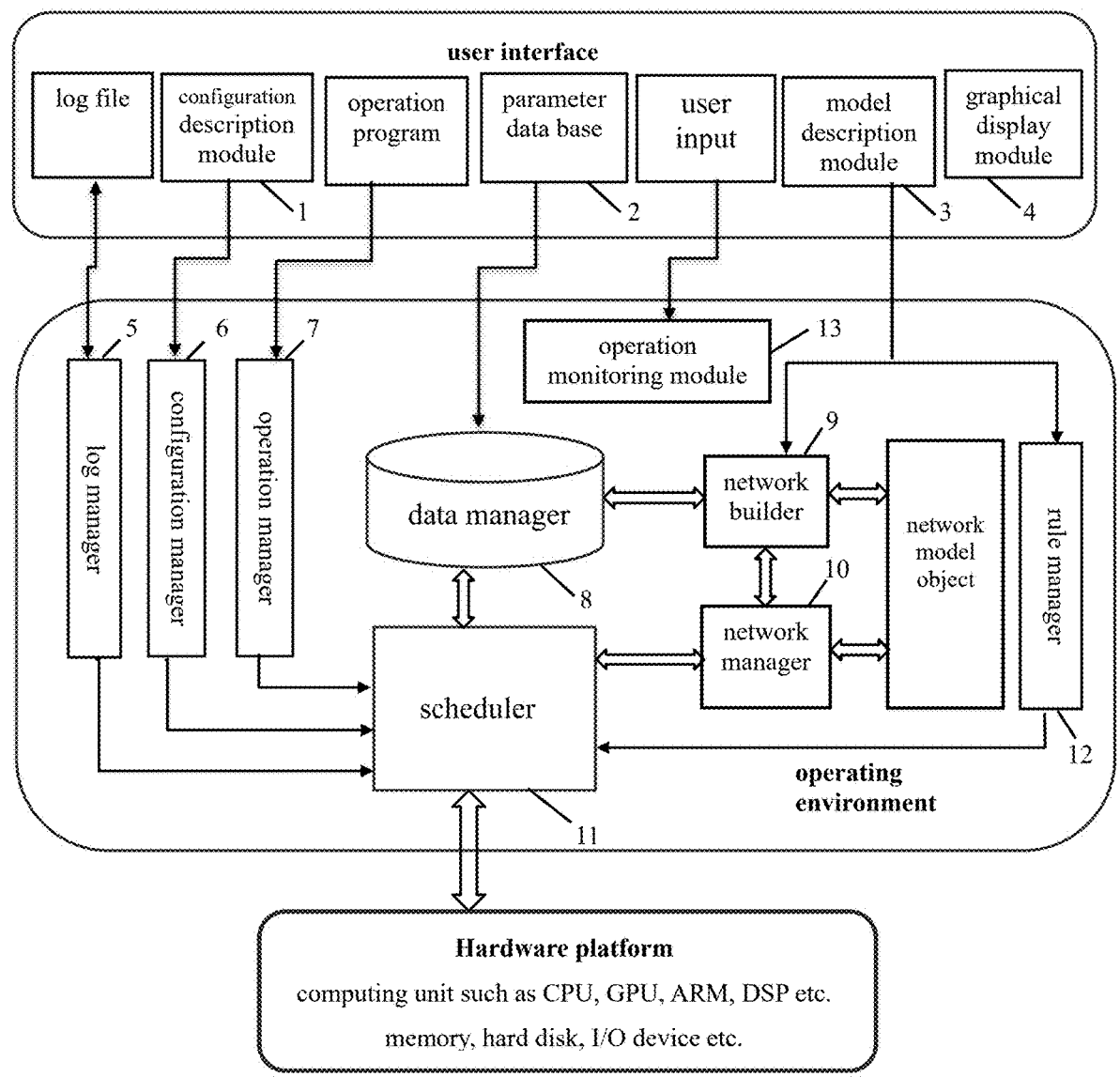
FIG. 1 is a schematic diagram of an overall architecture of a firing neural network computing system for brain-like intelligence and cognitive computing provided by the present application.

Referring to FIG. 1, an embodiment of the present application discloses a firing neural network computing system for brain-like intelligence and cognitive computing. The system includes a model description module 3, a parameter database 2, a configuration description module 1, a configuration manager 6, a rule manager 12, a data manager 8, a network builder 9, a network manager 10, an operation manager 7, a scheduler 11, a log manager 5, an operation monitoring module 13, and a graphical display module 4.

The model description module 3 includes a network description unit, a confluence description unit, and a flow description unit, which together describe various components and a topological structure of the entire network. The network description unit, the confluence description unit, and the flow description unit prefer to use nested syntax, and may choose a file format such as XML or JSON.

The network description unit may be configured to describe a container such as "Network" and "Param" etc., may be configured to describe parameters and operating rules of the entire network, and may be configured to point to one or more confluence description units and flow description units through links.

The confluence description unit may be configured to describe a container such as "Confluence", "Module", "Layer", "Node", "NodeParam", and "Param" etc., and may be configured to describe arrangement of modules and layers of nodes in the network, the parameters of each of the containers, and rules and commands during execution of each of the containers.

The flow description unit may be configured to describe a container such as "Flow", "Channel", "Link", "Edge", "EdgeParam", and "Param" etc., and may be configured to describe connection (topology) relationship of edges in the network, the parameters of each of the containers, and the rules and commands during the execution of each of the containers.

Figure 2:
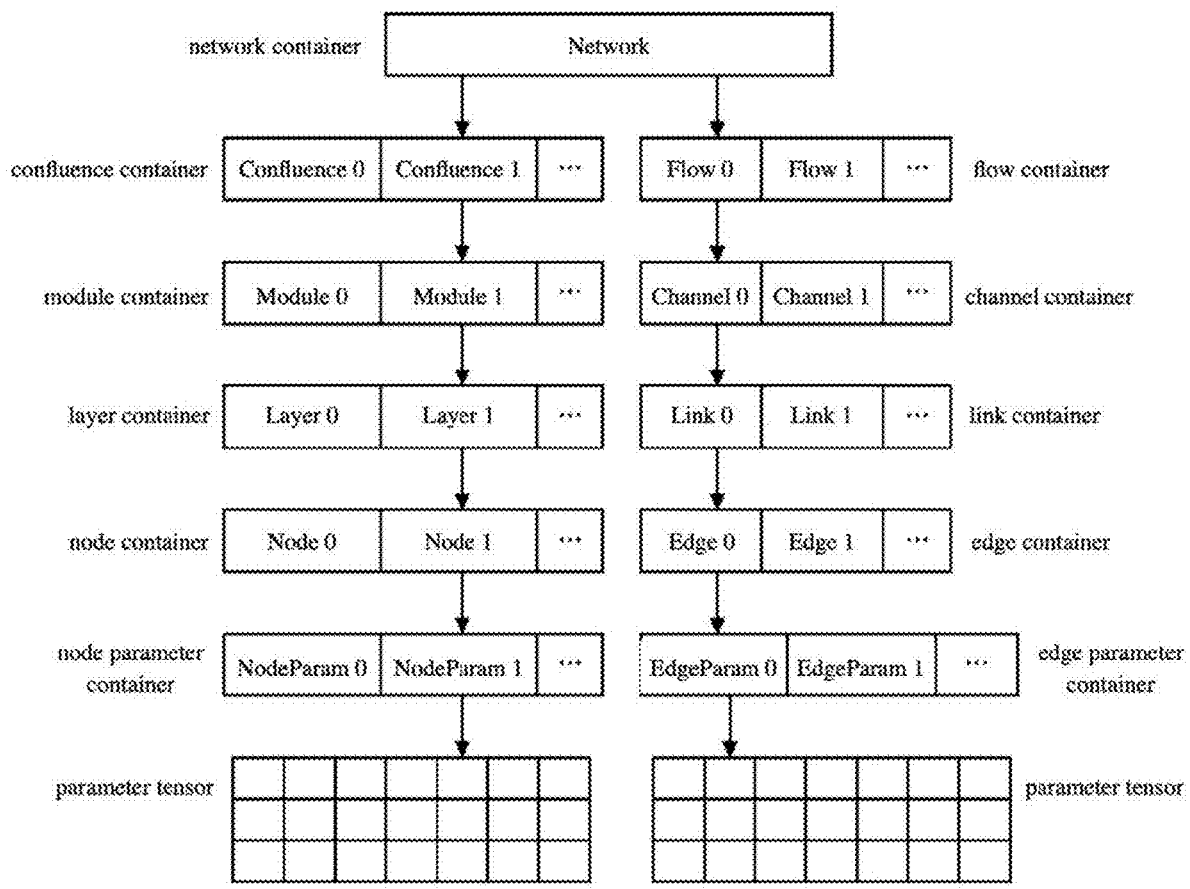
FIG. 2 is a schematic diagram of network hierarchies of a firing neural network computing system for brain-like intelligence and cognitive computing in an embodiment of the present application.

Referring to FIG. 2, the network description manner supported in the model description module 3 is preferably represented by a multi-level tree structure to simulate the organization manner of the biological brain and nerve system.

1. The confluence description unit supports organizing the nodes in the network according to a preset layer and module arrangement, which can characterize the multi-level organization manner of the neurons and related glias in the biological brain (e.g., nucleus→brain area-→whole brain).

2. The flow description unit supports grouping the edges in the network according to a topological (connection relationship) similarity and organizing the edges in a hierarchical arrangement, which can characterize various organization manners of the nerve synapses (such as dendrites, projections in neural pathways, nerve fiber bundles, etc.) and an organization manner of protrusions of related glias in the biological brain. This makes the development, debugging, management and scheduling of a large-scale brain-like neural network more intuitive and convenient.

Specifically, the above-mentioned multi-level tree structure is as follows.

"Network" represents a network container, which is located at a first level (top level) of the tree structure, and may be configured to characterize models of a whole brain and a behavioral scale. Each Network may accommodate one or more Confluences and Flows.

"Confluence" stands for a confluence container, which is located at a second level of the tree structure and may be configured to characterize a model at a brain area scale. Each Confluence may contain one or more Modules.

"Module" represents a module container, which is located at a third level of the tree structure and may be configured to characterize a model at a nerve nucleus scale. Each Module may contain one or more Layers.

"Layer" represents a layer container, which is located at a fourth level of the tree structure and may be configured to characterize a model at a neural circuit scale. Each Layer may contain one or more Nodes.

"Node" represents a node container, which is located at a fifth level of the tree structure and may be configured to characterize a model at a neuron scale or a glia scale, and may also be configured to characterize a group of neurons or glias. firing characteristics of a neuron model may be constructed as tonic firing, rapid firing, burst firing, plateau firing or phasic firing, etc., their responses to an upstream input signal may be constructed as different neural adaptation or sensitivity curves, and their mechanisms acting downstream may be constructed as a model such as an excitatory model, an inhibitory model, a modulatory model or a neutral model. The glia model may be constructed as a model such as an astrocyte model, an oligodendrocyte model, a microglia model, a Schwann cell model and a satellite cell model etc. Each Node may accommodate one or more NodeParams. When the Node is used to characterize a group of neurons of the same type, the number of NodeParam accommodated in the node is determined by the number of parameter types of the neuron model, that is, each type corresponds to one NodeParam and this type of parameters of all neurons in this Node are arranged and saved in a form of tensors.

"Node" may also be configured to characterize an input node or an output node, and is configured to interface with an I/O device of the system, such as a camera input, an audio input, a sensor input, a control output, etc. The data read and written from the I/O device is dynamically updated through each NodeParam of this Node.

"NodeParam" represents a node parameter container, which is located at a sixth level (the lowest level) of the tree structure, and may be used to characterize a model at a molecular scale, a receptor scale, a neurotransmitter scale or a neuromodulator scale etc., and may also be used to characterize a parameter tensor of a group of neuron modes or glia models. The neurotransmitter or neuromodulator model may be constructed as an excitatory, inhibitory or modulatory model. The receptor model may be constructed as an ionotropic or metabolic type, and its response effect to the neurotransmitter or neuromodulator may be constructed as an excitatory, inhibitory, modulatory or neutral model.

"Flow" stands for a flow container, which is located at the second level of the tree structure, and may be used to characterize a model at a scale of a nerve fiber bundle connecting brain areas. Each Flow may contain one or more Channels.

"Channel" represents a channel container, which is located at the third level of the tree structure and may be used to characterize a model of a conduction bundle composed of axons connecting the nerve nuclei. Each Channel may contain one or more Links.

"Link" represents a link container, which is located at the fourth level of the tree structure, and may be used to characterize a model of a neural pathway composed of axons in a neural circuit. Each Link may accommodate one or more Edges.

"Edge" stands for an edge container, which is located at the fifth level of the tree structure, and may be used to characterize a model at a dendrite scale or a synapse scale, and may also be used to characterize protuberances of a group of synapses or glias. A model at a dendrite scale may be constructed as a apical dendrite model, a basal dendrite model, or a spine model. The synapse model may be constructed as an excitatory, inhibitory, modulatory or neutral model. Each "Edge" may accommodate one or more EdgeParams. When the Edge is used to characterize a group of synapses of the same type, the number of the EdgeParam contained in the edge is determined by the number of parameter types of the synapse model. Each type corresponds to one EdgeParam, and this type of parameters of all synapses in this "Edge" are arranged and stored in a form of tensors.

"EdgeParam" stands for an edge parameter container, which is located at the sixth level (the lowest level) of the tree structure, and may be used to characterize a model at a molecular scale, a neurotransmitter or neuromodulator scale or a receptor scale, and may also be used to characterize a parameter tensor of a protuberance model of a group of synapses or glias. The model at the molecular scale may be constructed as an intracellular molecular model, a cytomembrane molecular model, and an intercellular molecular model. The neurotransmitter or neuromodulator model may be constructed as an excitatory, inhibitory or modulatory model. The receptor model may be constructed as an ionotropic or metabolic model, and its response effect to the neurotransmitter or neuromodulator may be constructed as an excitatory, inhibitory, modulatory or neutral model.

"Param" represents a general parameter container used as an auxiliary container. According to the needs of modeling, the above-mentioned containers at each level may additionally have one or more Params, which is used to accommodate parameter data in a form of tensors; or, the above-mentioned containers at each level may not be provided with the Param.

"NodeParam", "EdgeParam", and "Param" may accommodate parameters in the form of tensors (ie, multi-dimensional matrices) therein. The dimension of the tensor may be from 1 dimension to multiple dimensions, and its specific arrangement and use method are specified by the user. For example, the tensor can be 4-dimensional, and a position of each parameter in the tensor may be represented by coordinates (x, y, z, t), where the three dimensions of x, y, z correspond to a spatial arrangement position of each neural tissue (such as the neurons or synapses, etc.) model characterized in a parent container, and t represents a time dimension, which may characterize cache and delay of timing information and may be used to simulate a long-term action mechanism of the neuromodulators on the neurons and the synapses (provided with delay). For example again, the parameters in the tensor may be shared by all or part of the neural tissue (such as the neurons or the synapses) model in the parent container, and may be used to simulate a large-area effect of the neuromodulators on all neural tissues in a target area.

Each of the above containers is provided with a number and a name which are used for indexing in a multi-level tree structure. Each of the containers is provided with one or more control blocks used to store statistics and control information, such as a traversal order and rule of the network, the number of traversal operations that have been involved, whether the data has been stored in a main memory, whether the data has been stored in a memory of a coprocessor, and a read and write frequency of a hard disk, etc., which are managed and updated by the rule manager and scheduler.

The Flow and all its child containers may correspond to one or more upstream containers and one or more downstream containers, and may index and access them through the number or name of the upstream container and the downstream container. Both the upstream container and the downstream container may be a container at any level, and the two may be the same or different containers. Therefore, the Flow and all its child containers may form (unidirectional or bidirectional) information flow paths with their upstream container and downstream container, which characterize a flow and processing process between two information sources (such as the upstream container and the downstream container). Any topological structure provided with information flow may be formed among multiple containers in the network.

The above-mentioned information flow and processing process may be used to realize a variety of biological brain nerve mechanisms, such as nerve firing conduction between neurons through synapses, information exchange between synapses and synapses, and neuron and synaptic plasticity.

The above-mentioned any topological structure provided with information flow may be used to realize a connection manner of any kind of neural circuit in the brain nerve system, which includes a feedback connection supporting that the same neuron is connected back to itself, a mutual connection among the neurons of the same group (layer), an arbitrary (sequential/feedforward, cross-layer, feedback, etc.) connection among different groups (layers) of neurons, as well as a direct connection between the synapses, and allows endless loop calculations of the feedback connection.

Examples are taken as illustration in detail below.

When one Edge is used to represent one or more synapses, and its corresponding upstream and downstream containers are Nodes that represent one or more neurons, then:
1. if the upstream container and the downstream container of this Edge are different Nodes, then their topological relationship (for example, Node 1→Edge→Node 2) may be used to achieve forward/feedforward connection among different groups (layers) of neurons through synapses;
2. if the upstream container and the downstream container of this Edge are the same Node, then their topological relationship (for example, Node 1→Edge→Node 1) may be used to realize mutual connection among the neurons in the same group (layer) through the synapses, and may also be used to realize feedback connection that the neurons are connected back to themselves through an autapse;
3. if the upstream container and the downstream container of this Edge are Nodes from different Layers, then their topological relationship may be used to achieve cross-layer connection among the neurons in different layers through the synapses.

When some Edges are used to represent one or more synapses, and some Nodes are used to represent one or more neurons, and they form a topological relationship such as Node 1→Edge 1→Node N→Edge N→Node 1, then:
1. if the Nodes belong to different Layers, then this topological relationship may be used to realize a neural circuit among the neurons in different layers through the forward connections, cross-layer connection, and feedback connection;
2. if the Nodes belong to the same Layer, then the topological relationship may be used to realize a feedback loop composed of one or more (or one or more groups of) different neurons.

In the foregoing example, the synapses in the Edge may obtain their excitation timing information through accessing the neurons in the upstream container and the downstream container, perform calculations by combining their own parameters (such as weights), and propagate calculation results to the neurons in the upstream container and the downstream container, thereby realizing conduction of the nerve firing among the neurons through the synapses, as well as long-term and short-term plasticity mechanisms such as Hebbian, Anti-Hebbian, and STDP etc. The neurons in the Nodes may undergo functional changes or shaping (one type of neuronal plasticity) according to the received information (transmitted through the neurotransmitters or neuromodulators).

When one Edge is used to characterize one or more synapses, and at least one of its corresponding upstream container and downstream containers is an Edge characterizing one or more synapses, then their topological relationship (for example, Edge 1→Edge 2→Edge 3) may be used to realize direct connection relationship and direct information exchange among the synapses.

The above parameter database is used to store various parameter data of the network (including initialization parameters and runtime parameters). The parameter database may be selected as a binary file or a text file. The text file may adopt a CSV file format, or a file format in which data is separated by other characters. Each container may have one or more corresponding parameter databases. For example, the parameters contained in NodeParam, EdgeParam, or Param may be stored in one or more parameter databases, or multiple NodeParams, EdgeParams, or Params may share one or more parameter databases to store the same parameters. The user may place the parameter database of each container of the network in a corresponding subfolder under a model file path.

The modeling design method supported by this system may decompose a model at any level (or scale) into two parts: data and operation. As mentioned above, the data may be accommodated by NodeParam, EdgeParam or Param, and stored by the corresponding parameter database. Operations are executable programs (such as functions and classes containing the functions) that can access and update the aforementioned data.

For example, modeling of the neurons may adopt a traditional neuron model, its ReLU activation function is designed as an operation, and its threshold parameter is designed as data; the modeling of the neurons may also adopt a firing neuron model, a function of its leaky integrate-and-fire model is designed as an operation, and its parameters are designed as data.

For example again, the user may define one or more operations to enable the neurons in the same node (without using the Edge) to directly access each other and update each other's data, so as to achieve rapid information exchange. This may be used to simulate the electrical synapses in the biological brain nerve system.

For example again, the user may define one or more operations when modeling to enable the synapses in the same Edge to directly access each other and update each other's data, so as to realize rapid information exchange. This is used to simulate a case of mutual information exchange and logical operations among multiple synapses on the dendrites of the same neuron in the biological cranial nervous system, including mechanisms such as shunting inhibition.

To sum up, since this system provides a flexible and unified modeling method, and the provided multi-level tree structure network description manner supports a full-scale modeling of the biological brain nerve system and a flexible network topology, thereby the modeling scale and the modeling richness are organically unified, and all models at various scales are integrated into a unified neural network for operation. In addition, the data is characterized and stored in the form of tensors, which makes this system not only support the firing neural network, but also be compatible with the traditional neural network (deep learning) and other algorithms that use tensors as the main data characterizing method.

The above-mentioned operation manager 7 is configured to manage all operations executable on this system. The operation may be a program (including a code segment, a function, and a class) executable on a general-purpose CPU, ARM, DSP, GPU, or other processor. All the operations constitute an operation library. The operation manager 7 provides a programming interface configured to query and invoke a specified operation based on a number or a name of the operation. The user may specify an operation that need to be performed for each container in the model description module, and the operation that need to be performed is invoked by the scheduler during runtime and the corresponding operation is then executed. This ensures that this system has a certain cross-hardware platform versatility and may be executed on hardware platforms such as a general-purpose CPU, GPU, ARM, DSP, etc.

The above configuration description module 1 is configured to describe configuration parameters of the current network execution environment, such as a size of a memory pool available to this system, an execution mode (single, time multiple times, continuous execution), a maximum frequency of reading data from a hard disk or writing data into a hard disk, a condition for initiating the process of the synapses and the neurons pruning and genesis, and so on.

The above-mentioned configuration manager 6 is configured to read the configuration description module 1 to obtain system configuration parameters, and provide a programming interface for other components to invoke.

The above-mentioned network model object is constructed by the network builder 9 and is stored in the memory. The network model object characterizes the entire network, including all the containers, the topological relationships and the parameter data, which are objects invoked and executed by the scheduler.

The aforementioned rule manager 12 is configured to read rules declared by the user in the model description module 3, and interpret these rules when the scheduler 11 invokes an operation of the network model object. The user may specify one or more rules for each container in the model description module 3. All the rules constitute a rule base. The rule manager 12 sorts the rules in the rule base according to a preset priority. When multiple rules applied on one container conflict with each other, only the rule with the highest priority is executed. When one container does not specify any rules, the rule manager 12 adopts a default rule for execution.

The rules in the rule base include (but are not limited to): a traversal rule, a memory usage rule, a data I/O rule, a rule for synapses and neurons pruning and genesis, etc. The traversal rule may be used to instruct the scheduler to repeatedly traverse or skip all containers or a specific container of the network according to a second preset time interval or a fourth preset traversal period, so that a computing resource is concentrated in a sub-network that requires intensive computation, thereby improving data utilization efficiency. The memory usage rule may be used to guide the scheduler to rationally arrange use of a main memory and a memory of the coprocessor. The data I/O rule may be used to guide an exchange frequency of data scheduled by the scheduler between the main memory and the memory of the coprocessor, as well as between the memory and the hard disk, thereby saving the I/O resources and improving overall computing efficiency.

The aforementioned data manager 8 includes one or more types of decoders and encoders. The decoder is used to read and parse a data file in a format specified by the user, and convert content in the data file into a data type that can be calculated by a computer. The encoder is used to serialize the data in the memory according to a user-specified format for writing back to the hard disk. The file type of the data file may be a binary file or a text file (adopting a Unicode format or an ASCII format). The User may add a customized decoder and encoder in the data manager 8 to read and write a file in a customized format.

The above-mentioned network builder 9 reads the model description module 3, analyzes the topological structure of the network, and reads the data file through the data manager 8 to construct the network model object in the memory.

The above-mentioned network manager 10 provides a programming interface for constructing a network model object, and this interface invokes the network builder 9 to construct the network model object. The network manager 9 further provides a programming interface for accessing, traversing, and operating the network model object, and the programming interface supports querying and updating an arbitrary container, neuron, synapse, parameter, etc. through a number or name. The supported traversal sequence includes (but is not limited to):
1. depth-first traversal;
2. breadth-first traversal;
3. traversing according to the rules specified in the model description module.

Implementations of the traversal may include (but is not limited to):
1. loop traversal;
2. recursive traversal.

The aforementioned scheduler 11 is configured to allocate a hardware resource and schedule a calculation process to ensure optimal calculation efficiency. The scheduler 11 manages one or more main memory pools, and one or more device memory pools, so as to reasonably allocate the usage of the network model objects in the main memory and the device memories. The main memory pool is used to manage the use of the main memory; each coprocessor (which may be an ARM, a GPU, a DSP, an ASIC) has one or more corresponding device memory pools, which are used to manage the use of corresponding device memory. Their maximum capacity and minimum capacity are specified by the user through the configuration description module 1.

The above-mentioned scheduler 11 manages one or more thread pools for dynamically arranging sub-threads to participate in multi-threaded operations, so as to rationally arrange computing loads of the main computing unit (which may be a CPU, an ARM, etc.), the co-processor (which may be an ARM, a GPU, a DSP, etc.) and the I/O device (a hard disk, a camera, an audio input, a control output, etc.).

The above-mentioned scheduler 11 manages one or more node data input buffers, one or more node data output buffers, one or more edge data input buffers, and one or more edge data output buffers for buffering data required to be read and written in the hard disk or the I/O device. They preferentially adopt a data structure of a circular queue. Capacity of each buffer, a maximum frequency and a minimum frequency for reading and writing the hard disk or the I/O device, and a maximum throughput and a minimum throughput for reading and writing the hard disk or the I/O device are specified by the user through the configuration description module 1. According to the loads of the processor, the hard disk and the I/O device, the scheduler 11 arranges the hard disk and the I/O device to read and write in a timely manner to avoid I/O blockage.

Since the scheduler 11 is configured to reasonably allocate the use of hardware resources such as the processor, the coprocessor, the memory, the hard disk, and the IO device, this system is suitable for efficient execution on an embedded device with relatively limited hardware resources (such as memory).

This system provides the function of automatic synapse and neuron pruning and genesis according to a certain trigger condition and a certain execution rule. The user may specify the trigger condition for initiating the pruning or genesis process in the configuration description module 1, and specify the execution rule for the pruning or genesis process in the model description module 3. The execution rule may act on the entire network model object, or act on the sub-network or the specific container. The pruning or genesis process is scheduled by the scheduler 11 for execution, and may be executed when the network is executed or when the network is paused.

The trigger condition for initiating the pruning or genesis process may include (but is not limited to) one or more of the following:
1. a user command, that is, the user inputs a command to this system through a keyboard or a mouse or other way, and this system, after receiving the command, executes the pruning or genesis process immediately or after a first preset time;
2. continuous execution, that is, as long as the network model or its sub-region meets the rule for the pruning or genesis process, the pruning or genesis process will be executed;
3. interval execution, that is, the system automatically initiates the pruning or genesis process in a timely manner according to a first preset time interval or a first preset traversal period.

The execution rule for the pruning process is divided into a synaptic pruning rule and a neuron pruning rule. The synapse pruning rule may include (but is not limited to) one or more of the following:
1. if a parameter of a certain synapse and a statistic of parameters of all synapses in a specified reference synapse set reach a first preset numerical relationship (for example, a weight of a certain synapse is less than 1% of an average weight of all synapses in a specified edge), then this synapse is a synapse to be pruned;
2. if a parameter of a certain synapse and a specified threshold reach a second preset numerical relationship (for example, a weight of a certain synapse is less than 10.0), then this synapse is a synapse to be pruned;
3. if a certain synapse is not triggered after a second preset time or a second preset traversal period, then this synapse is a synapse to be pruned;
4. if a certain synapse is marked as able to be pruned by another calculation process, then this synapse is a synapse to be pruned; for the synapse to be pruned, a pruning operation may be performed.

The neuron pruning rule may include (but is not limited to) one or more of the following:
1. if a certain neuron does not have an input synapse, this neuron is a neuron to be pruned;
2. if a certain neuron does not have an output synapse, this neuron is a neuron to be pruned;
3. if a certain neuron does not have an input synapse and an output synapse, this neuron is a neuron to be pruned;
4. if a parameter of a certain neuron and a statistic of parameters of all neurons in a specified reference neuron set reach a third preset numerical relationship (for example, a threshold of a certain neuron is greater than a maximum value of thresholds of all neurons in a specified node), then this neuron is a neuron to be pruned;
5. if a parameter of a certain neuron and a specified threshold reach a fourth preset numerical relationship (for example, a threshold of a certain neuron is greater than 1000.0), then this neuron is a neuron to be pruned;
6. if a certain neuron does not perform firing after a third preset time or a third preset traversal period, then this neuron is a neuron to be pruned;
7. if a certain neuron is marked as able to be pruned by another operation process, then this neuron is a neuron to be pruned; for the neuron to be pruned, a pruning operation may be performed.

The execution rule for this genesis process is divided into a neuron genesis rule and a synapse genesis rule. The neuron genesis rule may include (but is not limited to) one or more of the following:

1. if a number of existing neurons in a certain node container and total capacity of this node container reach a first preset ratio or a fifth preset numerical relationship, then regenerate neurons based on a second preset ratio of the total capacity or a first preset number; here the first preset ratio and the second preset ratio may be the same or different;
2. a certain node container generates new neurons at a third preset ratio of the total capacity or a second preset number according to a first preset rate (that is, according to a preset time interval or a preset traversal period);
3. a certain node container is marked as a node container needing to generate new neurons by other calculation process, and the new neurons are generated according to a second preset rate (that is, at a preset ratio or number of the total capacity according to a preset time interval or a preset traversal period).

The synapse genesis rule may include (but is not limited to) one or more of the following:
1. if a number of existing synapses of a certain edge container and total capacity of this edge container reach a fourth preset ratio or a sixth preset numerical relationship, then new synapses are generated based on a fifth preset ratio of the total capacity or a third preset number; here the fourth preset ratio and the fifth preset ratio may be the same or different;
2. a certain edge container generates new synapses at a third preset rate (that is, at a preset ratio or number of the total capacity according to a preset time interval or a preset traversal period);
3. a certain edge container is marked as an edge container needing to generate new synapses by other calculation process, and the new synapses are generated according to a fourth preset rate (that is, at a preset ratio or number of the total capacity according to a preset time interval or a preset traversal period);
4. if a certain node container has a neuron without an input synapse or an output synapse, then a new input synapse or a new output synapse are generated in each corresponding edge container.

The above scheduler is responsible for scheduling the execution of synapses and neuron pruning and genesis. When the condition that initiates synapse and neuron pruning and genesis is triggered, the scheduler allocates one or more sub-threads from the thread pool that the schedule manages, and each of the one or more sub-threads is responsible for some areas or a specific container in the network model object. The sub-thread will traverse each container in its managing area and execute the neuron and/or synapse pruning and/or genesis process according to a specified rule.

The neuron or synapse genesis process may include allocating a required memory space in a container and creating a corresponding object (new/construct object); the neuron or synapse pruning process may include destructing the corresponding object (delete/destruct object) and releasing the occupied memory space.

This system provides the function of automatic execution of synapse and neuron pruning and genesis according to a certain condition and rule, and provides a variety of flexible trigger conditions for initiating the pruning and genesis process and rules for the execution processes, thereby relieving the burden that a neural network developer needs to write a program for synapse and neuron pruning and genesis by himself, and improving the flexibility and efficiency of the development. The synapse and neuron pruning process may be used alternately and cooperated with the synapse and neuron genesis process, which can optimize the coding efficiency of the neural network, greatly compress the size of the neural network and the required storage space, save the memory and improve the computing efficiency, thereby making this system suitable for executing on an embedded device provided with limited hardware resources. Through supporting the synapse and neuron pruning and genesis, this system is conducive to simulating the abundant mechanisms in the biological brain nerve system (such as synapse and neuron apoptosis and genesis of a hippocampus), and can better support brain-like intelligent and cognitive computing.

The above-mentioned log manager 5 is configured to record logs generated when the system is running, and the logs are used to prompt the user of a working status and abnormality of the system, so as to facilitate debugging and maintenance. The log includes a series of strings and time stamps, which may be displayed in a command line environment, or saved in a file and displayed by using a text browser. The log manager includes a log record programming interface and a log management service. The log record programming interface is invoked by the user in a program, and transmits log data to the log management service. The log management service is run by an independent thread to avoid blocking network operations, and uniformly sorts the received log data according to the time stamps and caches it in the memory. When the amount of the cached data reaches a certain level, the log management service saves the cached data to a hard disk in a certain order and cleans up the cache.

The above-mentioned operation monitoring module 13 is configured to receive and respond to a user input and manage an operation status of the entire system. It adopts a design of a state machine, including a default state, a network construction state, a network operating state, and a network pausing state. It includes a message queue for receiving and buffering a command entered by the user, and includes an independent thread for responding to the command in the queue in time, so that the state machine may switch between different states. The user may input a command through a keyboard, a mouse, a programming interface or other manner. The command includes (but is not limited to): a command for constructing a network, a command for starting running, a command for pausing running, a command for ending running, a command for pruning a synapse and neuron, and a command for generating a new synapse and neuron.

Figure 3:
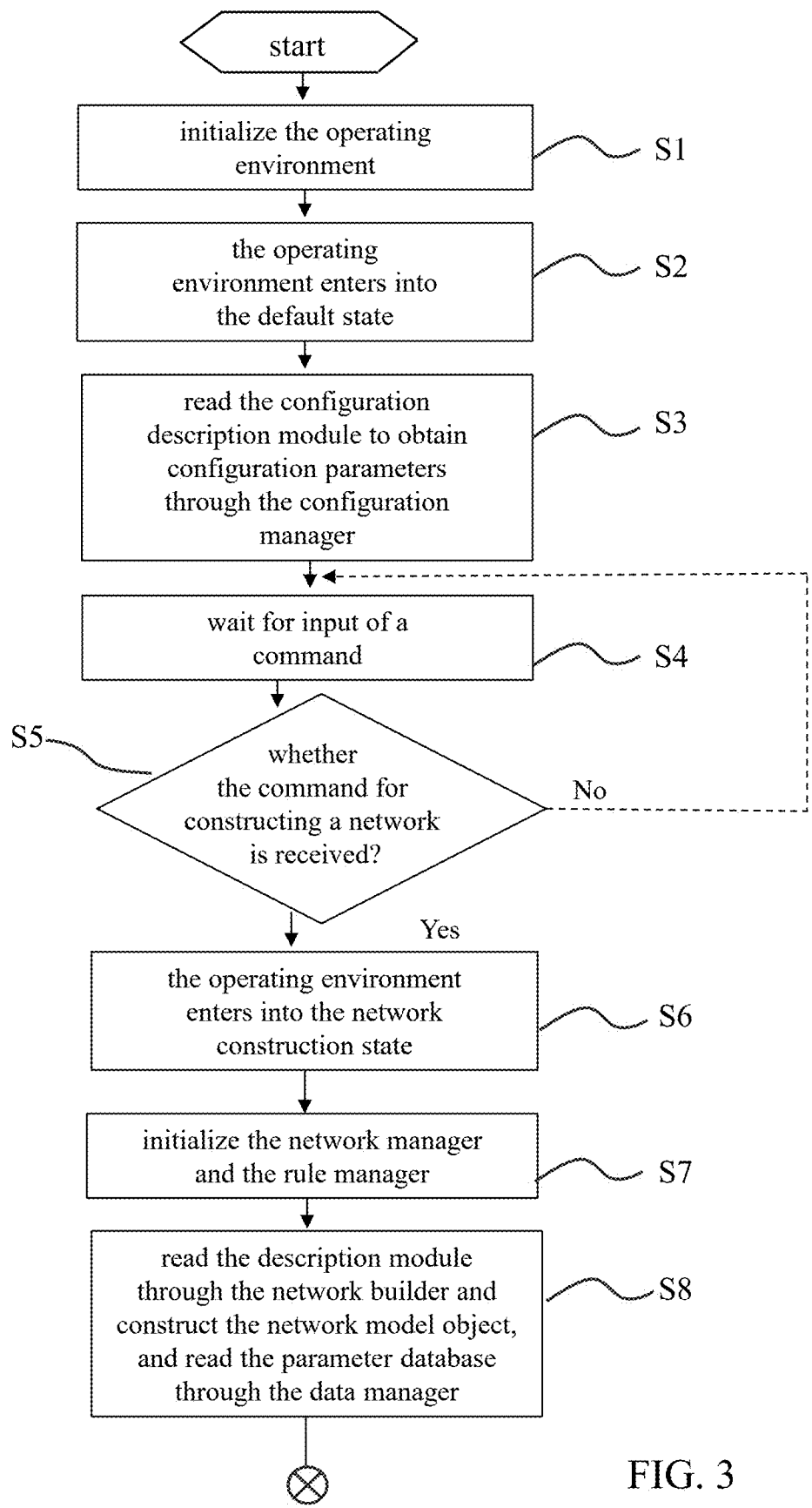
FIG. 3 is a flowchart diagram of a system operation process of a firing neural network computing system for brain-like intelligence and cognitive computing in an embodiment of the present application.
Figure 3:
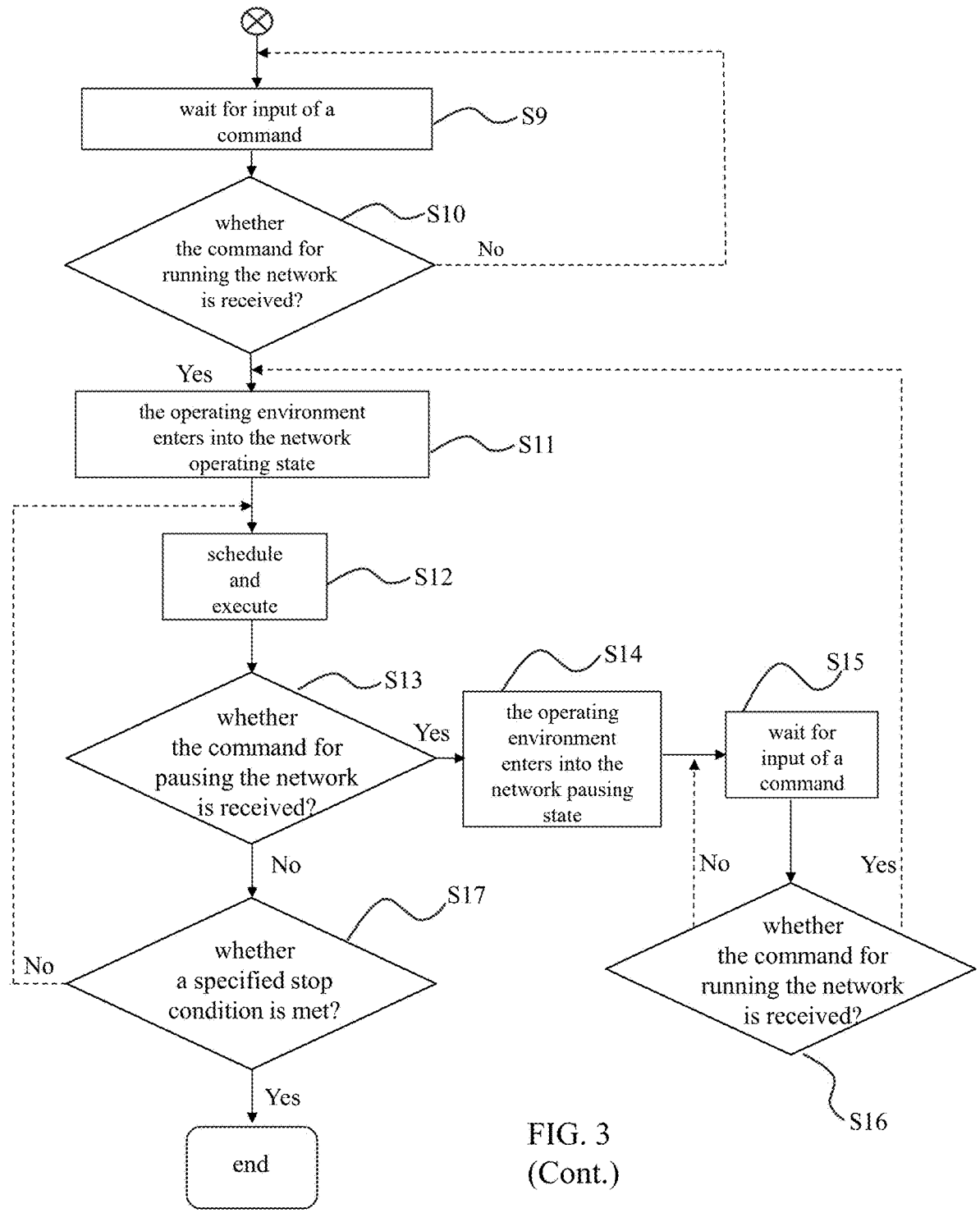

The following is a brief description of the operating principle of the system in conjunction with FIG. 3.

At S1, start the system and initialize the operating environment.

At S2, make the operating environment enter into the default state.

At S3, read the configuration description module to obtain configuration parameters through the configuration manager.

At S4, wait for input of a command.

At S5, determine whether the command for constructing a network is received until a determination result is positive, and go to a next step.

At S6, when the command for constructing a network is received, switch the operating environment into the network construction state.

At S7, initialize the network manager and the rule manager.

At S8, read the model description module through the network builder and construct the network model object, and read the parameter database through the data manager.

At S9, wait for input of a command.

At S10, determine whether the command for starting running is received, return to the step S9 and wait for the command input again when a determination result is negative, and go to a next step when the determination result is positive.

At S11, make the operating environment enter into the network operating state.

At S12, schedule execution.

At S13, determine whether the command for pausing running is received, go to a step S14 if a determination result is positive, and go to a step S17 if the determination result is negative.

At S14, make the operating environment enter into the network pausing state.

At S15, wait for input of a command.

At S16, determine whether the command for starting running is received, return to the step S11 if a determination result is positive, and return to the step S15 if the determination result is negative.

At S17, determine whether a specified stop condition is met (including the command for ending running is received, etc.), return to the step S12 if a determination result is negative, and end running if the determination result is positive.

When the system is initialized, the state machine is in the default state, starts the message queue, and starts to receive the user input; when receiving the command for constructing a network, the state machine switches into the network construction state and constructs the network model object; when receiving the command for starting running, the state machine switches into the network operating state and performs a network operation; when receiving the command for pausing running, the state machine switches into the network pausing state and pauses the network operation; when receiving the command for ending running, the state machine saves the network data to the hard disk, the system ends and exits. When the state machine is in the network operating state or the network pausing state, if there is the command for pruning a synapse and neuron in the message queue, the synapse and neuron pruning process is started through the scheduler; if there is a command for generating a new synapse and neuron in the message queue, the synapse and neuron genesis process is started through the scheduler. Because the system uses the operation monitoring module to manage the working status of the system, the system can be switched into the network pausing state when the application environment does not require a network operation, thereby saving power consumption and making this system suitable for an embedded system.

The above-mentioned graphical display module 4 is configured to read network data and display it to the user, which facilitates development, monitoring and debugging. The graphical display module 4 may directly read the data of the network model object in the memory, or may read the data stored in the hard disk. The graphical display module 4 adopts an independent thread to avoid blocking a network operation, so it may be displayed in real time during the network scheduling operation, and may also be displayed after the network scheduling operation ends.

It should be noted that the above-mentioned statements, such as preset times including from the first preset time to the third preset time, preset time intervals including from the first preset time interval to the second preset time interval, preset traversal periods including from the first preset traversal period to the fourth preset traversal period, preset numerical relationships including from the first preset numerical relationship to the sixth preset numerical relationship, preset ratios including from the first preset ratio to the fifth preset ratio, preset numbers including from the first preset number to the third preset number, and preset rates including from the first preset rate to the fourth preset rate, etc., are only aimed to facilitate distinguishing the preset time, preset time interval, preset traversal period, preset numerical relationship, preset ratio, preset number, and preset rate, and their specific values or ranges may be determined according to actual needs, which are not limited by the embodiments of the present application. In addition, the values of the aforementioned preset times, preset time intervals, preset traversal periods, preset numerical relationships, preset ratios, preset numbers, and preset rates may be the same or different. For example, the duration of the preset times including from the first preset time to the third preset time may be completely the same or completely different; or duration of part of the preset times including from the first preset time to the third preset time is the same, while the duration of the other part is different, which is not limited by the embodiments of the present application either.

The above description only describes optional embodiments of the present application, and is not used to limit the present application. For those skilled in the art, the present application may have various modifications and variations. Any modification, equivalent replacement, improvement, etc. made within the spirit and principle of the present application shall be included in the scope of claims of the present application.

What is claimed is:

1. A firing neural network computing system for brain-like intelligence and cognitive computing, wherein the firing neural network computing system comprises a computer processor including:
    a model description module configured to: provide an interface for a user to design and describe a network model, and specify an operation to be executed and a rule for an object of the network model including at least one execution rule for automatic pruning and/or genesis of synapses and neurons;
    a parameter database configured to store all parameter data of the network model in a form of the parameter database;
    a configuration description module configured to: describe configuration parameters of a current network operating environment, and a condition for initiating a synapse and/or neuron pruning and genesis process;
    a configuration manager configured to invoke configuration parameters from the configuration description module;
    a network builder configured to: read the model description module, parse a topological structure of a network, read a data file through a data manager, and construct the network model object in a memory;
    a network manager configured to: construct, traverse, access, and/or update the network model object;
    a rule manager configured to: read rules declared by the user in the model description module, interpret the rules declared by the user when a scheduler schedules an operation of the network model object, and arbitrate a conflict between the rules;
    the data manager configured to: read and parse the parameter database, convert a data format and serialize data;
    the scheduler configured to: allocate hardware resources and schedule operation processes, and schedule and execute a corresponding operation, the scheduler further configured to perform pruning and/or genesis of synapses and neurons in accordance with the at least one execution rule, wherein the scheduler without requiring manual programming intervention by the user automatically performs pruning and/or genesis of synapses and neurons in accordance with the at least one execution rule when the condition for initiating the synapse and/or neuron pruning and genesis process is met;
    an operation manager configured to manage running operations;
    a log manager configured to: record a log generated when the system is running, record a working status of the system, and prompt an abnormal condition;
    an operation monitoring module configured to: receive and respond to an instruction input by the user, and manage an operating status of the system; and,
    a graphical display module configured to read and display data of the network.

2. The firing neural network computing system for brain-like intelligence and cognitive computing according to claim 1, wherein, the model description module comprises a network description unit, a confluence description unit, and a flow description unit;
    the network description unit is configured to: describe a network container and a general parameter container, describe parameters and operating rules of the network, and point to one or more confluence description units and flow description units through links;
    the confluence description unit is configured to: describe at least one of a confluence container, a module container, a layer container, a node container, a node parameter container, and a general parameter container, and describe an arrangement of modules and layers of a node in the network, parameters of each of the network model objects, and rules and commands during execution of each of the network model objects;
    the flow description unit is configured to: describe at least one of a flow container, a channel container, an edge container, an edge parameter container, and the general parameter container, and describe a connection relationship of edges in the network, the parameters of each of the network model objects, and the rules and commands during the execution of each of the network model objects.

3. The firing neural network computing system for brain-like intelligence and cognitive computing according to claim 2, wherein, the model description unit adopts a network description manner of a multi-level tree structure simulating an organizing manner of a biological brain nerve system; the confluence description unit supports organization of the nodes in the network according to a preset layer and module arrangement configured to characterize a multi-level organization manner of neurons and related glias in a biological brain; the flow description unit supports grouping the edges in the network according to topological similarity and organizing the edges in the network in a hierarchical arrangement, characterizing multiple organization manners of nerve synapses in the biological brain and an organization manner of protuberances of the related glias.

4. The firing neural network computing system for brain-like intelligence and cognitive computing according to claim 2, wherein, the network description unit, the confluence description unit and the flow description unit use a file format of XML and/or JSON, and use a nested syntax.

5. The firing neural network computing system for brain-like intelligence and cognitive computing according to claim 1, wherein, the parameter data comprises initialization parameter data and parameter data during runtime.

6. The firing neural network computing system for brain-like intelligence and cognitive computing according to claim 1, wherein, the parameter database is a binary file or a text file, and the text file adopts a file format of CSV or a file format using other character to separate data.

7. The firing neural network computing system for brain-like intelligence and cognitive computing according to claim 1, wherein, the network model object comprises a container, a topological relationship and/or the parameter data, and the network model object is an object that the scheduler schedules to run.

8. The firing neural network computing system for brain-like intelligence and cognitive computing according to claim 7, wherein, the container comprises a number and/or name used in a multi-level tree structure for index.

9. The firing neural network computing system for brain-like intelligence and cognitive computing according to claim 7, wherein, the container is provided with one or more control blocks configured to store statistic and control information.

10. The firing neural network computing system for brain-like intelligence and cognitive computing according to claim 9, wherein, the one or more control blocks comprises at least one of: a traversal sequence and rule of the network, a number of times that a traversal operation has been performed, whether data has been stored in a main memory, whether the data has been stored in a memory of a coprocessor, and a frequency of reading and writing a hard disk, and the control block is managed and updated by the rule manager and the scheduler.

11. The firing neural network computing system for brain-like intelligence and cognitive computing according to claim 8, wherein, the container comprises:
  a network container located at a first level of the tree structure and configured to characterize a model at a whole brain and behavior scale;
  a confluence container located at a second level of the tree structure and configured to characterize a model at a brain area scale;
  a module container located at a third level of the tree structure and configured to characterize a model at a nerve nucleus scale;
  a layer container located at a fourth level of the tree structure and configured to characterize a model at a neural circuit scale;
  a node container located at a fifth level of the tree structure and configured to characterize a model at a neuron scale or a glia scale and characterize a group of neurons or glias;
  a node parameter container, located at a sixth level of the tree structure, configured to characterize models at a molecular scale, a receptor scale, a neurotransmitter scale, or a neuromodulator scale, and/or configured to characterize a tensor of parameters of a group of neuron models or glia models;
  a flow container located at the second level of the tree structure and configured to characterize a model at a scale of a nerve fiber bundle connecting brain areas;
  a channel container located at the third level of the tree structure and configured to characterize a model of a conduction bundle comprising axons connecting nerve nuclei;
  a link container located at the fourth level of the tree structure and configured to characterize a model of a neural pathway comprising axons in a neural circuit;
  an edge container, located at the fifth level of the tree structure, configured to characterize a model at a dendrite scale or synaptic scale, and/or configured to characterize protuberances of a group of synapses or glias;
  an edge parameter container, located at the sixth level of the tree structure, configured to characterize the model at the molecular scale, the neurotransmitter or neuromodulator scale, the receptor scale, and configured to characterize a parameter tensor of a model of the protuberances of the group of synapses or glias; and/or,
  a general parameter container configured to accommodate the parameter data in a form of a tensor;
  wherein the general parameter container is used as an auxiliary container, and the container at each level is capable of additionally having one or more of the general parameter containers.

12. The firing neural network computing system for brain-like intelligence and cognitive computing according to claim 11, wherein, a firing characteristic of the neuron model is constructed as comprising tonic firing, rapid firing, burst firing, plateau firing and/or phasic firing;
  a response of the neuron model to an upstream input signal is constructed as different neural adaptation or sensitivity curves;
  a mechanism of the neuron model acting downstream is constructed as an excitatory model, an inhibitory model, a modulatory model and/or a neutral model;
  the neuron model is constructed as a firing neuron model and/or a traditional neuron model;
  the glia model is constructed as an astrocyte model, an oligodendrocyte model, a microglia model, a Schwann cell model and/or a satellite cell model.

13. The firing neural network computing system for brain-like intelligence and cognitive computing according to claim 11, wherein, the neurotransmitter model or the neuromodulator model is constructed as an excitatory model, an inhibitory model, and/or a modulatory model;
  the receptor model is constructed as an ionotropic model and/or a metabolic model;
  a response effect to the receptor model on a neurotransmitter or a neuromodulator is constructed as an excitatory model, an inhibitory model, a modulatory model, and/or a neutral model.

14. The firing neural network computing system for brain-like intelligence and cognitive computing according to claim 11, wherein, the model at the dendrite scale is constructed as an apical dendrite model, a basal dendrite model, and/or a spine model;
  a synapse model is constructed as an excitatory model, an inhibitory model, a modulatory model, and/or a neutral model.

15. The firing neural network computing system for brain-like intelligence and cognitive computing according to claim 11, wherein, the model at the molecular scale is constructed as an intracellular molecular model, a cytomembrane molecular model, and/or an intercellular molecular model.

16. The firing neural network computing system for brain-like intelligence and cognitive computing according to claim 11, wherein, the node parameter container, the edge parameter container, and the general parameter container internally adopt a form of a tensor to accommodate parameters.

17. The firing neural network computing system for brain-like intelligence and cognitive computing according to claim 16, wherein, the tensor is one-dimensional or multi-dimensional, and an arrangement and a using manner of the tensor is specified by the user.

18. The firing neural network computing system for brain-like intelligence and cognitive computing according to claim 17, wherein, the tensor is configured as four-dimensional, and positions of the parameters in the tensor is indicated by a coordinate (x, y, z, t), where three dimensions of x, y, and z correspond to a spatial arrangement position of each of neural tissue models characterized in a parent container; t indicates a time dimension, characterizes cache and delay of timing information, and is used to simulate a long-term action mechanism of a neuromodulator;

the parameters in the tensor are shared by all or part of the neural tissue models in the parent container, and are used to simulate a large-area effect of the neuromodulator on all neural tissues in a target area.

19. The firing neural network computing system for brain-like intelligence and cognitive computing according to claim 11, wherein, the flow container and all child containers thereof correspond to one or more upstream containers and one or more downstream containers, and the upstream containers and the downstream containers are accessed through indexing numbers or names thereof.

20. The firing neural network computing system for brain-like intelligence and cognitive computing according to claim 19, wherein, the one or more upstream containers and the one or more downstream containers are containers at any level, and the one or more upstream containers and the one or more downstream containers are the same container or different containers.

21. The firing neural network computing system for brain-like intelligence and cognitive computing according to claim 11, wherein, each of the flow container and all child containers thereof constitutes an information flow pathway with an upstream container and a downstream container thereof, the information flow pathway characterizes a flow and processing process of information between two information sources, and a plurality of containers in the network constitute an arbitrary topological structure for information flow.

22. The firing neural network computing system for brain-like intelligence and cognitive computing according to claim 21, wherein, the flow and processing process of the information is used to realize at least one biological brain nerve mechanism.

23. The firing neural network computing system for brain-like intelligence and cognitive computing according to claim 22, wherein, the biological brain nerve mechanism comprises at least one of: conduction of nerve firing between the neurons through the synapses, information exchange between the synapses, and plasticity of the neurons and the synapses.

24. The firing neural network computing system for brain-like intelligence and cognitive computing according to claim 21, wherein, an arbitrary topological structure of the information flow is used to realize a connection manner of any neural circuit in the brain nerve system, including at least one of: a feedback connection supporting that a same neuron is connected back to itself, a mutual connection between neurons of a same group, an arbitrary connection between neurons of different groups, and a direct connection between the synapses, and allowing endless loop calculations for the feedback connection.

25. The firing neural network computing system for brain-like intelligence and cognitive computing according to claim 1, wherein, the model description module supports a modeling design manner that supports decomposition of a model at any level into two parts of data and operation, the data is accommodated in the node parameter container, the edge parameter container, and/or the general parameter container, and is stored in the corresponding parameter database;

the operation is configured as an executable program that is capable of accessing and updating the data, and the operation is executed on a general-purpose CPU, ARM, DSP, GPU, and/or other processor to ensure that the system is provided with cross-hardware platform versatility.

26. The firing neural network computing system for brain-like intelligence and cognitive computing according to claim 1, wherein, the model description module supports the user to define one or more operations to make neurons in a same node container directly access each other and/or update each other's data, so as to realize rapid exchange of information, such that the model description module is configured to simulate electrical synapses in a biological brain nerve system.

27. The firing neural network computing system for brain-like intelligence and cognitive computing according to claim 1, wherein, the model description module supports the user to define one or more operations to make synapses in a same edge container directly access each other and/or update each other's data, so as to achieve rapid exchange of information, such that the model description module is configured to simulate a situation of performing mutual information exchange and a logic operation among a plurality of synapses on dendrites of a same neuron in a biological brain nerve system, including a shunting inhibition mechanism.

28. The firing neural network computing system for brain-like intelligence and cognitive computing according to claim 1, wherein, the system supports automatic execution of a function of synapse and/or neuron pruning and genesis according to a preset trigger condition and execution rule;

the trigger condition is specified by the user in the configuration description module;

the execution rule is specified by the user in the model description module;

the execution rule acts on the network model object, and/or act on a sub-network or a specific container;

the synapse and/or neurons pruning and genesis process is scheduled and executed by the scheduler, and is executed at a network operating state and/or at a network pausing state.

29. The firing neural network computing system for brain-like intelligence and cognitive computing according to claim 28, wherein, the trigger condition comprises one or more of:

a user command, wherein the user inputs a command to the system through a keyboard or a mouse or other manner, and the system executes the pruning or genesis process immediately or after a first preset time once receiving the command;

continuous execution, wherein the pruning or genesis process is executed when a model of the network or a sub-area thereof meets a rule of the pruning or genesis process;

interval execution, wherein the system automatically starts the pruning or genesis process according to a first preset time interval or a first preset traversal period.

30. The firing neural network computing system for brain-like intelligence and cognitive computing according to claim 28, wherein, the execution rule of the pruning process comprises a synaptic pruning rule and/or a neuron pruning rule;
the synapse pruning rule comprises one or more of following:
if a parameter of a first certain synapse and a statistic of parameters of all synapses in a designated reference synapse set reach a first preset numerical relationship, then the first certain synapse is a synapse to be pruned;
if a parameter of a second certain synapse and a designated threshold reach a second preset numerical relationship, then the second certain synapse is a synapse to be pruned;
if a third certain synapse is not triggered after a second preset time or a second preset traversal period, then the third certain synapse is a synapse to be pruned;
if a fourth certain synapse is marked as a synapse to be pruned, then the fourth certain synapse is a synapse to be pruned;
the neuron pruning rule comprises one or more of following:
if a first certain neuron is not provided with an input synapse, then the first certain neuron is a neuron to be pruned;
if a second certain neuron is not provided with an output synapse, then the second certain neuron is a neuron to be pruned;
if a third certain neuron is not provided with an input synapse or an output synapse, then the third certain neuron is a neuron to be pruned;
if a parameter of a fourth certain neuron and a statistic of parameters of all neurons in a specified reference neuron set reach a third preset numerical relationship, then the fourth certain neuron is a neuron to be pruned;
if a parameter of a fifth certain neuron and a designated threshold reach a fourth preset numerical relationship, then the fifth certain neuron is a neuron to be pruned;
if a sixth certain neuron does not perform firing after a third preset time or a third preset traversal period, then the sixth certain neuron is a neuron to be pruned;
if a seventh certain neuron is marked as a neuron to be pruned, then the seventh certain neuron is a neuron to be pruned.

31. The firing neural network computing system for brain-like intelligence and cognitive computing according to claim 28, wherein, the execution rule of the genesis process comprises a neuron genesis rule and/or a synapse genesis rule;
the neuron genesis rule comprises one or more of following:
if a number of existing neurons in a first certain node container and a total capacity of the first certain node container reaches a first preset ratio or a fifth preset numerical relationship, new neurons are generated at a second preset ratio or first preset number of the total capacity of the first certain node container;
new neurons are generated in a second certain node container at a third preset ratio or a second preset number of the total capacity according to a first preset rate;
if a third certain node container is marked as a node container needing to generate new neurons, then the new neurons are regenerated at a second preset rate;
the synapse genesis rule comprises one or more of following:
if a number of existing synapses of a certain first edge container and a total capacity of the first certain edge container reach a fourth preset ratio or a sixth preset numerical relationship, then new synapses are generated at a fifth preset ratio or a third preset number of the total capacity of the first certain edge container;
new synapses are generated in a second certain edge container at a third preset rate;
if a third certain edge container is marked as an edge container needing to generate new synapses, then the new synapses are generated at a fourth preset rate;
if a fourth certain node container is not provided with a neuron having an input synapse or an output synapse, then new input synapses or new output synapses are respectively generated in corresponding edge containers.

32. The firing neural network computing system for brain-like intelligence and cognitive computing according to claim 1, wherein, an operating status of the system comprises a default state, a network construction state, a network operating state and/or a network pausing state.

33. The firing neural network computing system for brain-like intelligence and cognitive computing according to claim 1, wherein, the user specifies one or more rules for containers in the model description module, and the one or more rules constitute a rule base;
the rule manager sorts rules in the rule base according to a preset priority, only a rule provided with a highest priority is executed when multiple rules acting on one of the containers conflict with each other, and the rule manager adopts a default rule for execution when there is no rule specified for one of the containers;
the rules in the rule base comprises: a traversal rule, a memory usage rule, a data I/O rule, and/or a synapse and neuron pruning and genesis rule;
the traversal rule is used to guide the scheduler to repeatedly traverse or skip traversing at least one container of the network according to a second preset time interval or a fourth preset traversal period, so as to concentrate computing resources in a sub-network having intensive calculations and improve usage efficiency of the data;
the memory usage rule is used to guide the scheduler to arrange usage of a main memory and/or a memory of coprocessor;
the data I/O rule is used to guide the scheduler to schedule a frequency of data exchange between the main memory and the memory of the coprocessor and between a memory and a hard disk.

34. The firing neural network computing system for brain-like intelligence and cognitive computing according to claim 1, wherein, the scheduler manages one or more main memory pools and one or more device memory pools;
the main memory pools are configured to manage usage of main memories;
the device memory pools correspond to coprocessors and are configured to manage usage of corresponding device memories;
maximum capacity and minimum capacity of the main memory pools and the device memory pools are specified by the user through the configuration description module.

35. The firing neural network computing system for brain-like intelligence and cognitive computing according to claim 1, wherein, the scheduler manages one or more thread pools configured to dynamically arrange child threads to participate in a multi-thread operation, so as to arrange an operation load of a main computing unit, a coprocessor, and/or an I/O device.

36. The firing neural network computing system for brain-like intelligence and cognitive computing according to claim 35, wherein, the scheduler manages one or more node data input buffers, one or more node data output buffers, one or more edge data input buffers and one or more edge data output buffers that are used to buffer data from reading and writing a hard disk or the I/O device, so that the scheduler arranges the hard disk or the I/O device to read and write based on a load of a processor, the hard disk and/or the I/O device, so as to avoid I/O blocking.

37. The firing neural network computing system for brain-like intelligence and cognitive computing according to claim 36, wherein, capacity of each of the buffers, a maximum frequency and a minimum frequency of reading and writing the hard disk or the I/O device, and a maximum throughput and a minimum throughput of reading and writing the hard disk or the I/O device are specified by the user through the configuration description module.

38. A firing neural network computing method for brain-like intelligence and cognitive computing, wherein, the method uses the firing neural network computing system for brain-like intelligence and cognitive computing according to claim 1.

* * * * *